(12) United States Patent
LaCous (10) Patent No.: US 7,117,356 B2
(45) Date of Patent: Oct. 3, 2006

(54) SYSTEMS AND METHODS FOR SECURE BIOMETRIC AUTHENTICATION

(75) Inventor: Mira K. LaCous, Eagan, MN (US)

(73) Assignee: BIO-key International, Inc., Eagan, MI (US)

( * ) Notice: Subject to any disclaimer, the term of this patent is extended or adjusted under 35 U.S.C. 154(b) by 0 days.

(21) Appl. No.: 10/442,005

(22) Filed: May 20, 2003

(65) Prior Publication Data

US 2003/0218534 A1 Nov. 27, 2003

Related U.S. Application Data

(60) Provisional application No. 60/382,282, filed on May 21, 2002.

(51) Int. Cl.
*H04L 9/00* (2006.01)
*H04K 1/00* (2006.01)
*G06F 7/04* (2006.01)

(52) U.S. Cl. ............................. 713/150; 726/5; 713/186

(58) Field of Classification Search ................ 713/150, 713/168, 170, 172, 174, 182, 184, 186, 160; 709/225, 229; 382/115; 380/277; 726/5
See application file for complete search history.

(56) References Cited

U.S. PATENT DOCUMENTS

| | | | |
|---|---|---|---|
| 3,959,884 A | 6/1976 | Jordan et al. ................. 283/69 |
| 4,151,512 A | 4/1979 | Riganati et al. ............ 382/125 |
| 4,185,270 A | 1/1980 | Fischer, II et al. .......... 382/125 |
| 4,607,384 A | 8/1986 | Brooks ........................ 382/124 |
| 4,790,564 A | 12/1988 | Larcher et al. ................ 283/69 |
| 5,105,467 A | 4/1992 | Kim et al. .................. 382/125 |
| 5,140,642 A | 8/1992 | Hsu et al. ................... 382/124 |
| 5,261,008 A | 11/1993 | Yamamoto ................... 382/127 |
| 5,572,597 A | 11/1996 | Chang et al. ............... 382/125 |
| 5,631,971 A | 5/1997 | Sparrow ...................... 382/125 |
| 5,659,626 A | 8/1997 | Ort et al. .................... 382/125 |
| 5,664,027 A | 9/1997 | Ittner .......................... 382/170 |
| 5,841,888 A | 11/1998 | Setlak et al. ................ 382/124 |
| 5,901,239 A | 5/1999 | Kamei ........................ 382/125 |
| 6,002,787 A | 12/1999 | Takhar et al. ............... 382/125 |
| 6,049,621 A | 4/2000 | Jain et al. .................... 382/125 |
| 6,072,895 A | 6/2000 | Bolle et al. .................. 382/125 |
| 6,181,807 B1 | 1/2001 | Setlak et al. ................ 382/124 |
| 6,226,391 B1 | 5/2001 | Dydyk et al. ............... 382/125 |
| 6,233,348 B1 | 5/2001 | Fujii et al. ................... 382/125 |
| 6,241,288 B1 | 6/2001 | Bergenek et al. ............. 283/67 |
| 6,256,737 B1 * | 7/2001 | Bianco et al. .............. 713/186 |
| 6,263,438 B1 * | 7/2001 | Walker et al. .............. 713/182 |

(Continued)

OTHER PUBLICATIONS

Soutar, Colin, "Biometric System Security", 2002, pp. 1-7.*

(Continued)

*Primary Examiner*—Matthew Smithers
*Assistant Examiner*—Courtney Fields
(74) *Attorney, Agent, or Firm*—Christopher L. Holt; Westman, Champlin & Kelly, P.A.

(57) ABSTRACT

A biometric security system is disclosed. The system includes a client security system configured to make a request for access to an application module. The application module is configured to receive the request and respond by sending an instruction to the authentication module to initiate an authentication session. The authentication module is configured to receive the instruction and respond by generating a session packet that is transferred to the client security system. The client security system is further configured to generate an authorization packet that is returned to the authentication module after being encrypted utilizing information contained in the session packet.

45 Claims, 10 Drawing Sheets

U.S. PATENT DOCUMENTS

| | | |
|---|---|---|
| 6,289,112 B1 | 9/2001 | Jain et al. .................... 382/116 |
| 2001/0007127 A1* | 7/2001 | Staring ....................... 713/160 |
| 2002/0030359 A1 | 3/2002 | Bergenek et al. ............. 283/68 |
| 2002/0031245 A1 | 3/2002 | Rozenberg et al. ......... 382/125 |
| 2002/0041700 A1 | 4/2002 | Therbaud .................... 382/124 |
| 2002/0076054 A1* | 6/2002 | Fukutomi et al. ........... 380/277 |
| 2003/0033545 A1* | 2/2003 | Wenisch et al. ............ 713/202 |

OTHER PUBLICATIONS

European Search Report.

Practical Image Processing Inc. By Craig A. Lindley Published by John Wiley & Sons, Inc. 1991.

* cited by examiner

SYSTEMS AND METHODS FOR SECURE BIOMETRIC AUTHENTICATION

REFERENCE TO RELATED CASE

This application claims priority from U.S. Provisional Application Ser. No. 60/382,282 filed on May 21, 2002, and entitled "BIOMETRIC SECURITY SYSTEMS AND METHODS".

BACKGROUND OF THE INVENTION

The present invention generally pertains to biometric security systems. More specifically, the present invention pertains to biometric security systems that provide an enhanced defense against unlawful hackers and other system attackers.

Within a typical biometric security system, there are at least two operations, enrollment and authentication. The operation of enrollment encompasses the original sampling of a person's biometric information, and the creation and storage of a match template (a.k.a., an enrollment template) that is a data representation of the original sampling. The operation of authentication includes an invocation of a biometric sample for the identification or verification of a system user through comparison of a data representation of the biometric sample with one or more stored match templates.

Biometric information is, by nature, reasonably public knowledge. A person's biometric data is often casually left behind or is easily seen and captured. This is true for all forms of biometric data including, but not limited to, fingerprints, iris features, facial features, and voice information. As an example, consider two friends meeting. The one friend recognizes the other by their face and other visible key characteristics. That information is public knowledge. However, a photo of that same person 'is' not that person. This issue similarly applies, electronically, to computer-based biometric authentication wherein a copy of authorized biometric information is susceptible to being submitted as a representation of the corresponding original information. In the context of biometric security applications, what is important, what enables a secure authentication, is a unique and trusted invocation of an authorized biometric.

A key issue confronting biometric authentication for security applications is providing some sort of assurance that the biometric sample being processed during authentication is a true and trusted sample. Numerous known biometric security systems are susceptible to being duped because a data representation received by a security processor during authentication is actually a fraudulent invocation of biometric information. For example, an individual in possession of a copy of authorized biometric information can submit the copy during authentication to gain unauthorized access. In a particularly dangerous scenario, an individual in possession of an electronic copy of authorized biometric information can fraudulently bypass the physical collection of biometric information and directly submit the copy to an electronic security processor during the operation of authentication to gain unauthorized access.

To ensure a trusted invocation of biometric information, data integrity should be maintained during each stage or level of the authentication process. The integrity of any transfers of information between a capture device and a processor, and between a processor and any subsequent applications, should be maintained. In particular, the processor responsible for receiving and processing biometric information submitted by a user should be able to 'trust' the biometric data it receives. In other words, there should be a trusted relationship between a device that gathers a user's biometric information (i.e., a fingerprint scanner) and a security processor responsible for processing that biometric information.

Ensuring that access is granted only upon unique and trusted invocations of authorized biometric information is a challenge relevant to most all biometric security systems.

SUMMARY OF THE INVENTION

One embodiment of the present invention pertains to a biometric security system. The system includes a client security system configured to make a request for access to an application module. The application module is configured to receive the request and respond by sending an instruction to the authentication module to initiate an authentication session. The authentication module is configured to receive the instruction and respond by generating a session packet that is transferred to the client security system. The client security system is further configured to generate an authorization packet that is returned to the authentication module after being encrypted utilizing information contained in the session packet.

DETAILED DESCRIPTION OF ILLUSTRATIVE EMBODIMENTS

I. Illustrative Contextual Environments

Various aspects of the present invention pertain to biometric security systems that provide an enhanced defense against unlawful hackers and other system attackers. The concepts of the present invention are designed to operate in conjunction with a broad range of general security applications, including but not limited to physical access security applications, computer network security applications, individual computer security applications, Internet based applications and systems, security applications and other general security applications. The methods and systems of the present invention are also generally suitable for improving the performance and reliability of user authentication systems.

Embodiments of the present invention can be specifically implemented to enhance security provided in association with a variety of access points. Some of these access points are associated with a physical space, such as a building, a room, a particular airport terminal, an airplane, etc. In accordance with one embodiment, a biometric scanner is physically positioned within an unsecured area, while access to a separated secured area is denied to anyone who is unable to present authorized biometric information to the biometric scanner for processing by an associated access control program. In accordance with another embodiment, a biometric scanner is physically positioned on an unsecured side of a locked door that remains locked until authorized biometric information is received by the biometric scanner and adequately processed by an associated access control program.

Embodiments of the present invention can also be implemented to enhance security provided in association with electronic access points. Through interaction with a computing device, a user is able to encounter a wide variety of functional and informational access points or transaction access points, most all of which can potentially be secured with the systems and methods associated with the present invention.

A potentially securable electronic access point is encountered when a user is presented with an ability to gain general access to a particular computer network (e.g., a particular LAN, the Internet, etc.). Another potentially securable electronic access point is encountered when a user is presented with an ability to access a particular collection of information (e.g., medical records, account information, personnel information, protected data files, etc.) that is stored on the computing device with which the user is interacting, or is accessibly stored on a remote computing device. Another potentially securable electronic access point is encountered when a user is presented with an ability to access and operate a particular program that is stored on the computing device with which the user is interacting, or is accessibly stored on a remote computing device. Still other potentially securable electronic access points are encountered when a user is presented with an ability to access information stored within a particular file or directory, or an ability to access a class of information that is identified in a particular manner (e.g., confidential), or an ability to utilize functions associated with another independent device (e.g., a particular camera, scanner, cash drawer, vault, etc). These are only a few of many electronic access points that could be secured utilizing the systems and methods of the present invention.

The present invention is useful with various types of biometric technology. Specific technologies include iris or retina eye-scan technology, voice technology, face technology, hand geometry technology, DNA technology, spectral biometric technology and fingerprint technology, for example. To the extent that the present description describes a fingerprint-based system, such description is intended to be but one example of a suitable system. The scope of the present invention is not so limited.

II. Illustration Operational Environment

Figure 1:
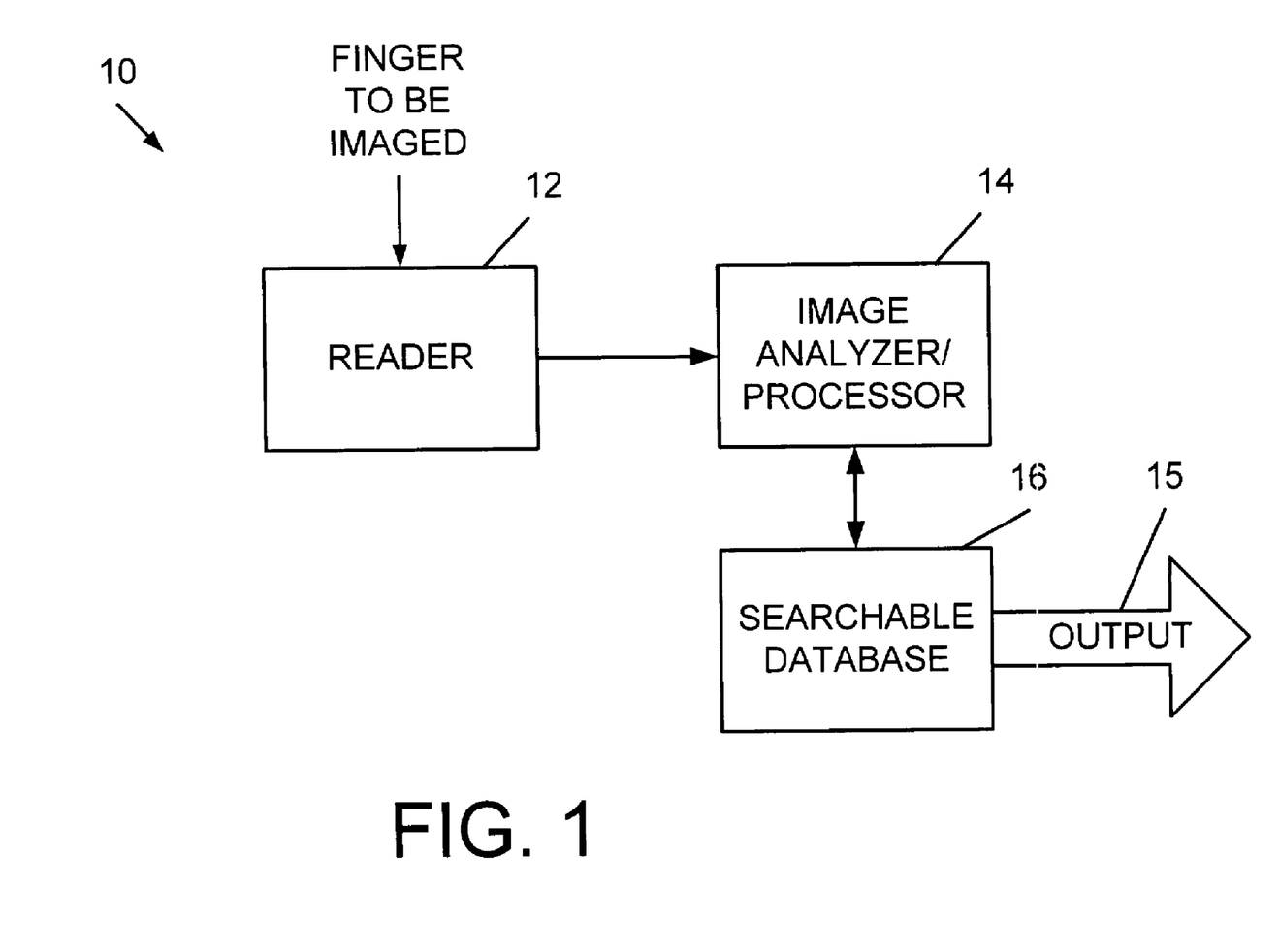
FIG. 1 is a block diagram of a user authentication system.

FIG. 1 is a block diagram of a user authentication system 10. User authentication system 10 includes a reader portion 12, image analyzer/processor 14 and searchable database 16, which further includes an output 15. Reader portion 12 could be any of a number of known systems capable of scanning an image of a fingerprint and transferring data pertaining to the image to an image analyzer, such as image analyzer/processor 14.

In many cases, reader portion 12 will include an optical or electronic device that includes a platen designed to receive the finger to be imaged, and a digitized image is produced. The reader commonly uses light or electricity to image the finger's pattern. Finally, the digitized image is transferred out of the reader portion to an image analyzer/processor 14. Image analyzer/processor 14 varies with application, but generally analyzes the image data received for a wide variety of purposes and applications.

Image analyzer/processor 14 is illustratively configured to create an authentication model (a.k.a., image model) based on the particular features and characteristics of images received from reader portion 12. In accordance with one embodiment, authentication models are more than facsimiles of their associated fingerprint images and include a unique range of data elements that provide various analytical opportunities. Authentication model creation is described in U.S. patent application Ser. No. 09/991,589, filed on Nov. 16, 2001, entitled IMAGE IDENTIFICATION SYSTEM, which is owned by the present Applicant, and the contents of which are hereby incorporated by reference in their entirety.

In one embodiment, image analyzer/processor 14 directly or indirectly compares data elements of a generated authentication model to data elements of at least one other authentication model stored within searchable database 16. The authentication models stored in database 16 illustratively correspond to previously obtained scanned images, while the authentication model being compared illustratively corresponds to a contemporaneously scanned image. User authentication system 10 is configured to efficiently make a determination as to whether the authentication model corresponding to the contemporaneously scanned fingerprint is substantially similar to any of the authentication models (or directly related data collections) included within the searchable database 16. In this manner, user authentication system 10 provides an efficient and accurate fingerprint image identification system. Such a system is used, for instance, as a security measure to determine whether the person who places a finger on the reader portion 12 should be authorized to enter a room, to access a bank account or to take any other variety of actions.

As is shown in FIG. 1, searchable database 16 includes an output 15. The precise nature of output 15 depends on the context within which user authentication system 10 is to be applied. For instance, output 15 could be a positive or negative match indication, or an identification indicator of an authentication model or data collection contained in searchable database 16 that substantially matches or corresponds to the image scanned by reader portion 12. These are but several examples of the many potential forms of output 15. In addition, output 15 can include data to be communicated to an application.

III. Operational Overview

Figure 2:
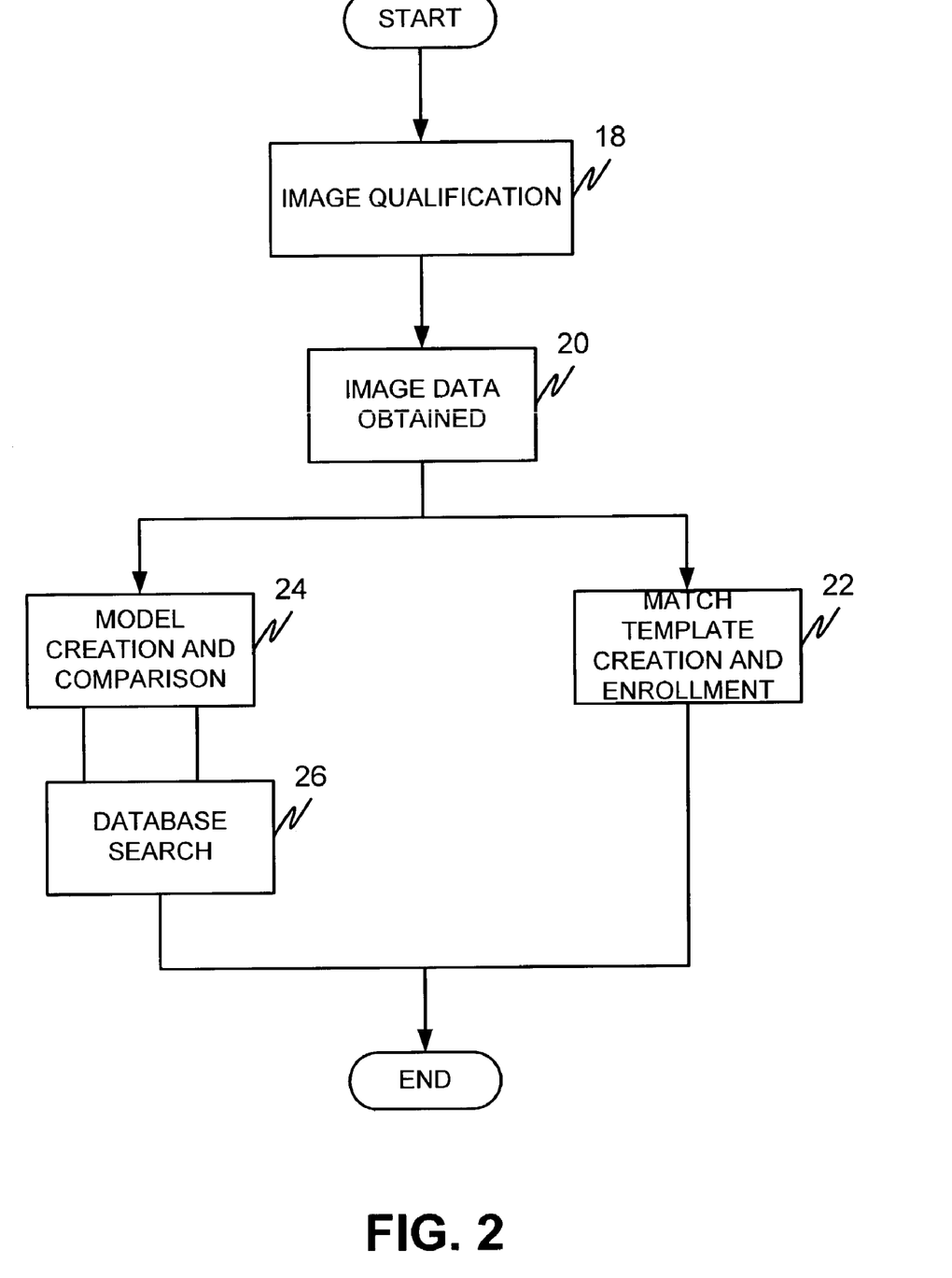
FIG. 2 is a flow diagram illustrating operations performed in association with the biometric security system.

FIG. 2 is a flow diagram illustrating operations to be carried out within system 10, for example within analyzer/processor 14, in accordance with an embodiment of the present invention. The process begins when image analyzer/processor 14 receives image data from reader portion 12. After receiving image data, image analyzer/processor 14 illustratively first performs, as is indicated by block 18 in FIG. 2, a series of image qualification functions.

Briefly, image qualification 18 involves quickly processing all or part of the available image data to ensure that the received image is a scan of a real fingerprint (as opposed to a fraudulent fingerprint) and of sufficient quality to proceed with processing. In one embodiment, if the image qualification process leads to the conclusion that the scanned image is fraudulent or of insufficient quality, then processing of the image is interrupted. In such a case, the system user is provided with feedback pertaining to identified inadequacies and is allowed to continue processing only when the inadequacies have been corrected.

Block 20 in FIG. 2 represents the point at which qualified image data has been obtained. After qualified image data has been obtained, the image data is utilized for at least one of two purposes. First, as is indicated by block 22, is match template creation and enrollment. Block 22 represents a process in which match templates are generated (i.e., based on digitized qualified image data) and entered into and catalogued within searchable database 16.

In accordance with one embodiment, match templates and authentication models are generated in accordance with the same algorithm or two substantially similar algorithms such that they are produced in the same or a substantially similar format. In accordance with one embodiment; however, match templates are generated utilizing an algorithm that is substantially different than the algorithm utilized to generate authentication models. Accordingly, an authentication model and a match template generated based on the same data will be related but not identical. This enables an indirect, relationship-based comparison process during authentication. This process is the subject of a co-pending application that is owned by the present Applicant.

As is indicated by block 26 in FIG. 2, a database search 26 can be performed in association with model comparison 24 to determine which, if any, of multiple match templates stored in the searchable database adequately match a generated authentication model. Illustratively, database search 26 is a quick and efficient determination as to which, if any, of potentially thousands, or even millions, of enrollment templates (or data collections related thereto) within database 16 exhibit a desired level of similarity, as compared to a target authentication model. Search can be done by biometric information alone, or by some identifier like employee ID, User ID, account number, etc. In accordance with one embodiment, an identifier (i.e., an employee ID, User ID, account number, etc.) is utilized to select a single collection of data to be compared to a target authentication model on a one-to-one basis. The target authentication model is illustratively an authentication model associated with a contemporaneously scanned image.

In accordance with one embodiment, rather than comparing authentication models directly to match templates, a set of database keys that describe different match template characteristics are defined to facilitate general rather than specific comparisons to be made during the database search 26 process.

The foundation of the security provided lies in the ability to obtain a unique and trusted invocation of the user's biometric data. Accordingly, the process of generating an authentication model based on a user's biometric information should be protected, trusted and secured. The authentication model must be trusted as a true representation of the user's newly presented biometric information (i.e., a live invocation). The analyzer/processor must be able to 'trust' the biometric data it receives. Preventing the authentication model data from being replayed (i.e., electronic replay) is paramount.

IV. Enhanced Authentication Security

Figure 3:
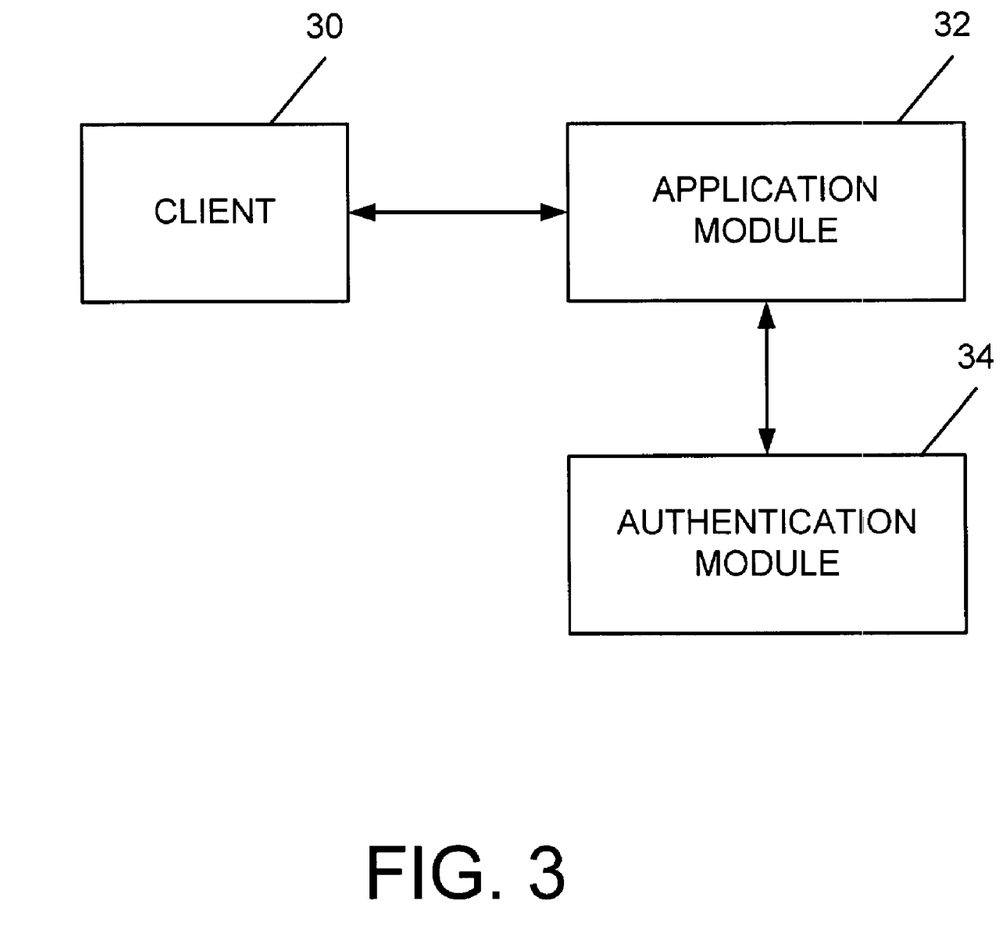
FIG. 3 is a block diagram of a particular illustrative environment wherein a client is utilized to access an application that is protected by an access control system that includes an authentication module.

User authentication system 10 (FIG. 1) may be incorporated into a variety of different general security environments. One illustrative environment exists wherein a client computing device is instructed to access some sort of application that is protected by an access control system that includes an authentication module. FIG. 3 illustrates a general block diagram of such an environment.

With reference to FIG. 3, a client 30 is illustratively instructed (e.g., directed by a user) to access an application module 32 (e.g., instructed to utilize module 32 to access a particular collection of data). Client 30 illustratively includes a reader 12 and image analyzer/processor 14 as described above in relation to FIG. 1. Accordingly, client 30 is configured to receive biometric information from the user and generate an authentication model as has been previously been described.

Application module 32 illustratively can be any sort of application including but not limited to a database application, a web site application, an e-mail application, a web browser application, a word processing application, a spreadsheet application, a government application, or a physical or electronic access control application. Some aspect of application module 32 (or of data accessibly associated therewith) is illustratively of a sensitive nature, thereby making it desirable that access thereto be granted only to authorized clients and/or users. In order to enable access to be selectively granted and denied, application module 32 cooperates with authentication module 34 to facilitate a screening of the identity of client 30 and/or an associated user. Authentication module 34 illustratively includes searchable database 16 as described above in relation to FIG. 1.

In accordance with one aspect of the present invention, client 30 facilitates generation of an authentication model, and then transmission of the authentication model to authentication module 34. Authentication module 34 then evaluates the authentication model (e.g., identifies whether it is affiliated with an authorized user having biometric information enrolled within database 16). Once this evaluation is complete, a result is sent to application module 32, which illustratively grants or denies access in accordance therewith. Those skilled in the art will appreciate that the various illustrated modules may be associated with one computer device or distributed across a plurality of computer devices. The plurality of computer devices may extend across one or more computer networks, including but not limited to the Internet.

Figure 4:
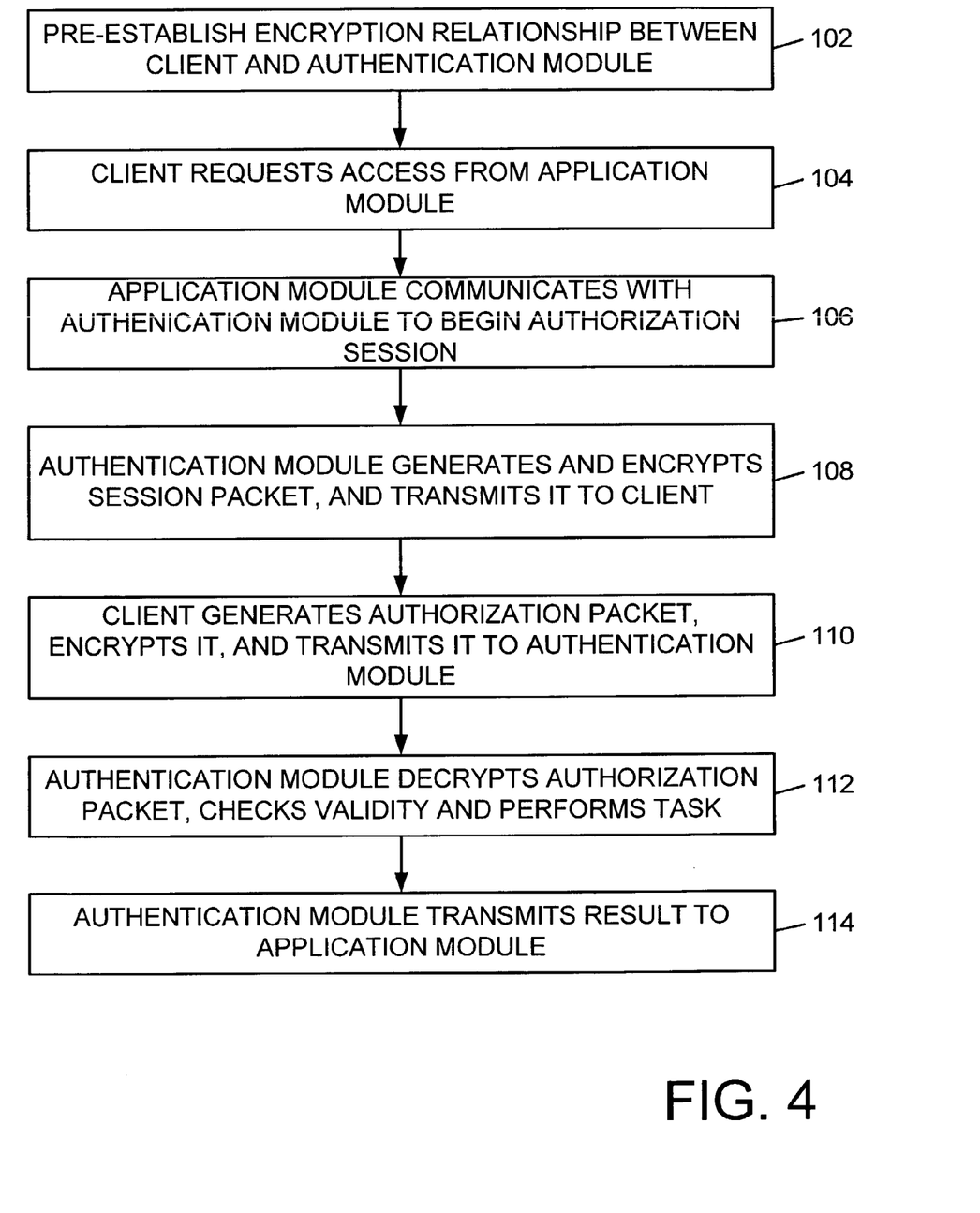
FIG. 4 is a flow diagram illustrating operations performed to enhance the level of security provided by a user authentication system.

FIG. 4, in accordance with one aspect of the present invention, illustrates a method for enhancing the level of security provided in the context of the above-described authentication processes. The method of FIG. 4 is generally applicable within the environmental considerations discussed in relation to FIG. 3.

Initially, as is indicated at step 102, an encryption relationship is pre-established between client 30 and the authentication module 34. In one mode of operation, each of the client 30 and the authentication module 34 has a stored encryption component (e.g., an encryption component operably stored with an associated specialized software component). The encryption component associated with client 30 is directly affiliated with the encryption component associated with authentication module 34 (e.g., one of the encryption components is utilized to decrypt information that has previously been encrypted utilizing the other encryption component).

In accordance with one embodiment, the encryption component associated with client 30 is a first part of a PKI key pair and the encryption component associated with authentication module 34 is a second part of the key pair. One of the first and second parts of the PKI key pair is illustratively a private encryption key and the other is illustratively a corresponding public encryption key. Related encryption component pairs other than a PKI pair (e.g., a predetermined related static key pair) could be utilized without departing from the scope of the present invention.

After an encryption relationship has been pre-established between client 30 and authentication module 34, the next step, in accordance with step 104 in FIG. 4, is for client 30 to request access from application module 32. In accordance with one embodiment, the request corresponds to a command or similar interaction initiated by a user. Once access has been requested, assuming that the requested access involves restricted or secured rights, the application module 32 then communicates with the authentication module 34 to initiate an authorization session at step 106. Illustratively, an authorization session opens upon initiation and closes after a predetermined time period. The predetermined time period is illustratively chosen to be about as long, with whatever lead or support time is required, as it takes to complete an authorization process (the authorization process is described in detail below). In accordance with one embodiment, the predetermined time period is chose to be about as long as it would take an average user to participate in and complete the authorization process.

At step 108, The authentication module 34 then generates a session packet. A session packet illustratively includes two items. The first included item is a session number, which is a unique, illustratively non-consecutively generated, number that is created for each session packet. A session packet is created for each initiated session. A session is initiated for each request for access to a secured item. A second item included in a session packet is one portion of a PKI key pair, illustratively a public key portion.

After the session packet has been generated, it is encrypted utilizing the pre-established encryption component associated with authentication module 34. The encrypted session packet is then transmitted to client 30. A copy of the session number is illustratively retained with the authentication module. A private key is also retained. The private key illustratively corresponds to the public key that is encryptically stored within the session packet.

As is indicated by step 110, client 30 generates an authorization packet. To accomplish this, client 30 utilizes the pre-established encryption component associated with client 30 to decrypt the session packet. Accordingly, client 30 then has access to the generated (and illustratively but not necessarily unique) public key. Client 30 retrieves biometric information from the user seeking access and generates an authentication model based on that information. The authentication model and the session number illustratively comprise at least two parts of the authorization packet. The authorization packet is encrypted in accordance with the public key taken from the session packet.

Next, the encrypted authorization packet is transmitted to the authentication module. There, the retained private key is utilized to decrypt the authorization packet, which was encrypted with a corresponding public key (the public key previously transferred within the session packet). As is indicated at step 112, the retained session number is compared to the received session number to be sure that the two values match. A check is made to be sure that the received session number was received within a proper predetermined time frame (e.g., as measured from the moment the session number was created). If the session number does not match or wasn't received in time, then the authentication model is not utilized for any subsequent purpose.

Assuming the session numbers do match and timing is adequate, and that the generated private key can decrypt the data, the authentication model is then utilized to perform a task, such as authentication model matching (i.e., database comparison) or template registration into a database. The session packet and/or the authorization packet could illustratively be formatted to include a command element that corresponds to the task that is supposed to be performed.

After the task has been completed, as is indicated by block 114, the authentication module transmits a result to the application module 32 at step 114. The result might be, but is not limited to, an indication that enrollment registration is complete, or a positive or negative match indication.

V. Application within a Network Enviornment

Figure 5:
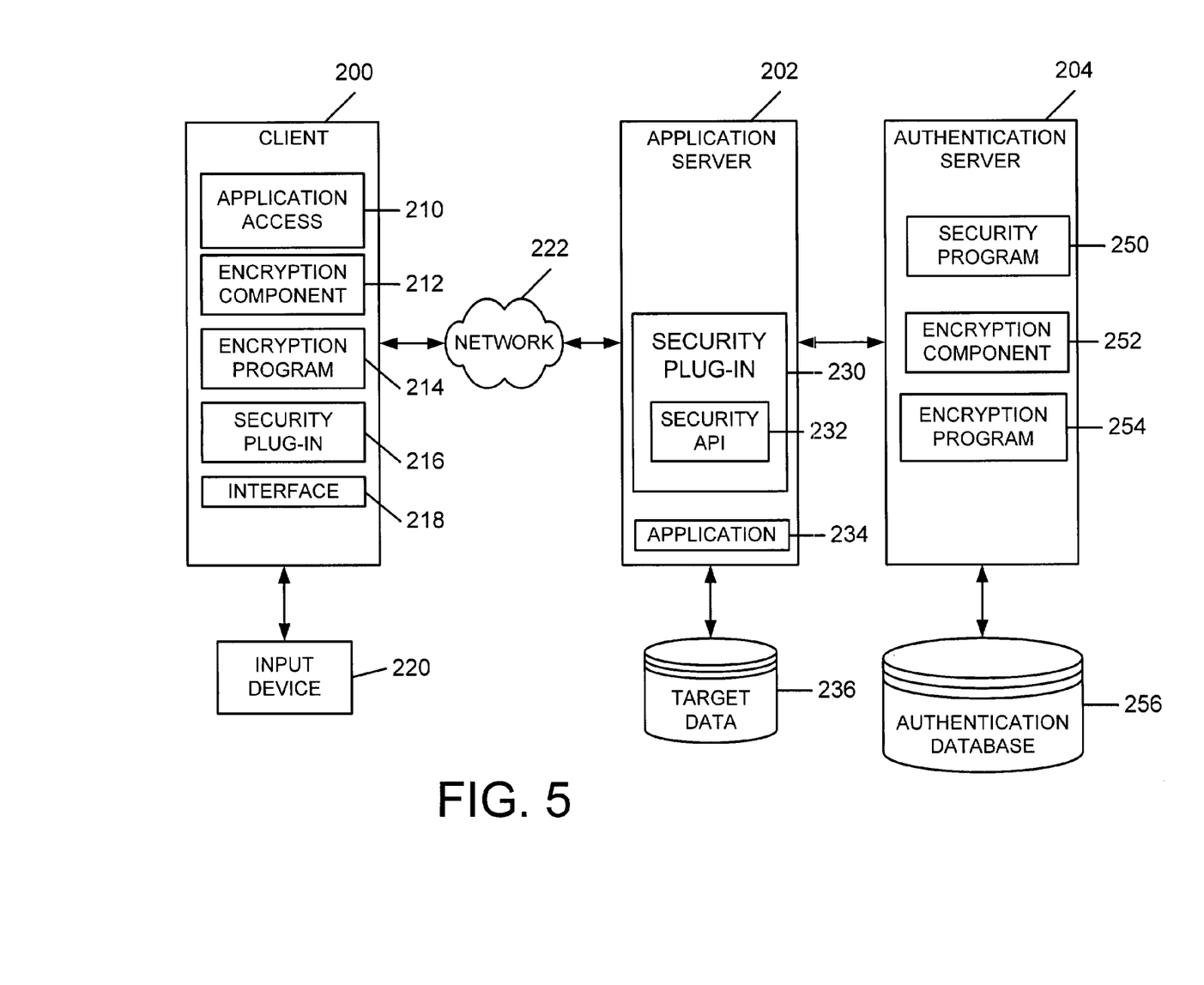
FIG. 5 is a schematic diagram illustrating a particular illustrative environment that includes a distributed network of computers.

One useful environment for the method illustrated in FIG. 4 is within a distributed network of computers, such as the Internet. FIG. 5 illustrates such an exemplary environment. The exemplary environment includes a client 200, application server 202 and authentication server 204.

Client 200 includes application access 210, encryption component 212, encryption program 214, security plug-in 216 and input device interface 218. Input device 220 can be a fingerprint reader or scanner as described above or some other biometric information receiver. Input device 220 interfaces with client 200 via user input interface 218. Client 200 is connected to application server 202 via network 222 which may illustratively be the Internet, a LAN, or another network system.

Application server 202 includes security plug-in 230, which has a security application program interface 232. Application server 202 also includes application 234. Application server 202 further has access to target data 236 using application 234.

Authentication server 204 includes security program 250, encryption component 252 and encryption program 254. Authentication server 204 has access to authentication database 256.

Client 200 includes encryption component 212 corresponding to encryption component 252 stored on authentication server 204. In one embodiment, encryption program 254 generates a PKI key pair. Encryption component 252 holds the private key portion for later decryption of a returning session packet, and returns the public key portion for use by the encryption component 214. This process is described in greater detail below. Security program 250 generally utilizes encryption component 252 and encryption program 254 to encrypt certain communications to client 200. Client 200 utilizes encryption component 212 to decrypt those communications, which uses encryption component 212 and encryption program 214.

In the FIG. 5 exemplary environment, it is assumed that client 200 wishes to access target data 236, which is accessible through application 234 on the application server 202. Access to target data 236 is illustratively secured and reserved for authorized access only. Client 200 includes application access 210, which allows client 200 to access application 234. For example, application access 210 is a web browser and application 234 is a website. Target data 236 might be personal information, such as bank account or medical record information. Assuming he or she is authorized to do so, and can adequately prove such authority, then a user can utilize client 200 to access target data 236. When a user instructs client 200 to request access to target data 236, security plug-in 230, in cooperation with security application program interface 232, requests security program 250 to begin an authorization session.

Figure 6:
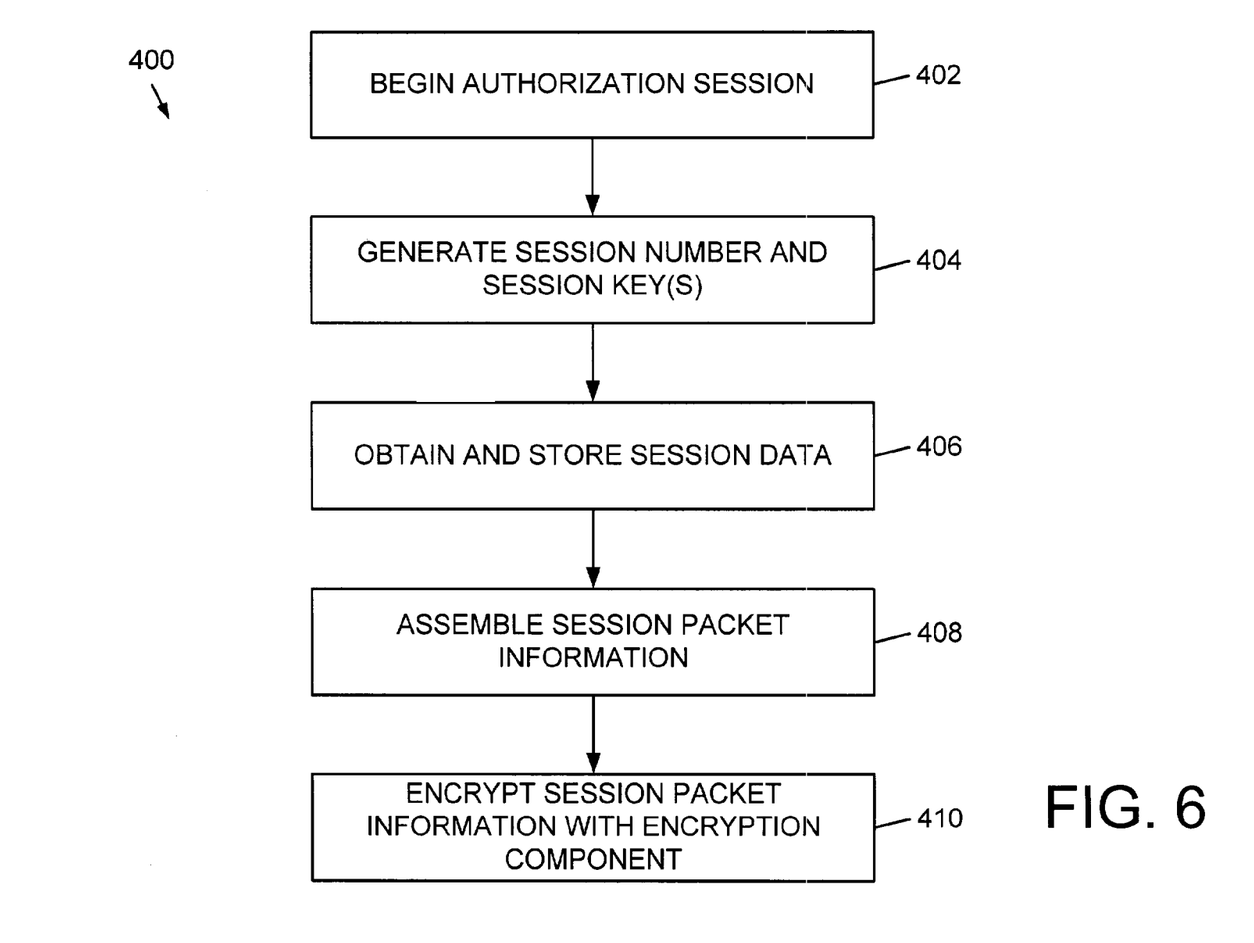
FIG. 6 is a flow diagram illustrating creation of a session packet.

Authorization server 204 generates a session packet according to method 400 illustrated in FIG. 6. At step 402, authorization server 204 initiates an authorization session. Next, a session number and session key (a public/private key pair) is generated at step 404. At step 406, session data (e.g., the session number and a time stamp) is stored. A private key that corresponds to the public session key is stored for later decryption of data sent from client 200. Session packet information is assembled at step 408. Next, at step 410, the session packet information is encrypted using encryption component 252 in encryption program 254.

Figure 7:
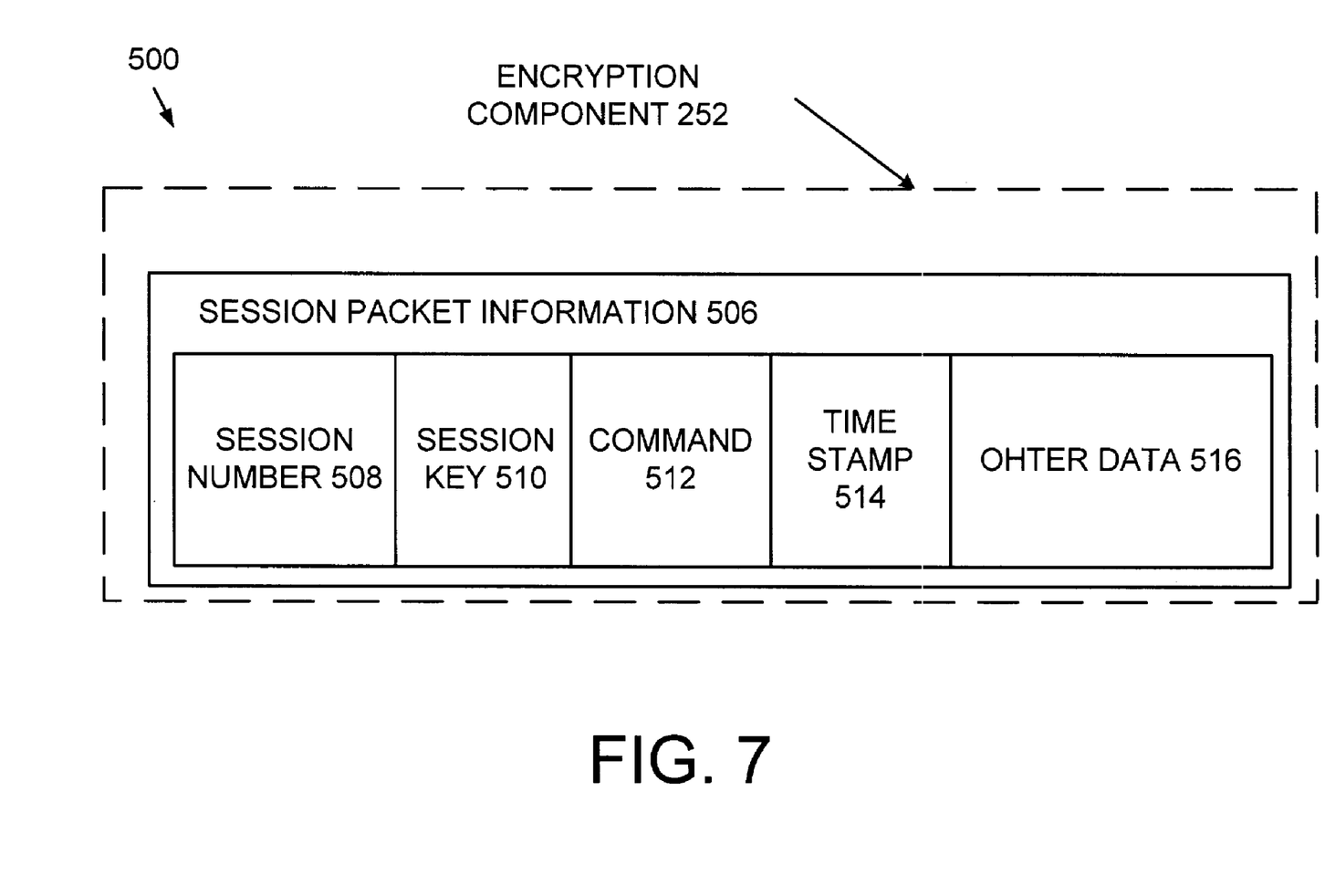
FIG. 7 is a diagrammatic view of a session packet.

As a result of the steps of method 400, a session packet 500, illustrated in FIG. 7, is generated. As illustrated, session packet 500 is encrypted with encryption component 252 and is then ready to be transmitted to client 200. Session packet 500 includes session packet information 506, which illustratively includes session number 508, session key 510 (public key), command 512 (optional element), time stamp 514 and other data 516.

Session number 508 is illustratively a non-sequentially generated number that is unique to a particular session. Session key 510 (public key) can also be unique to a particular session but does not have to be. However it can be more secure when it is unique. Whether or not the public key does vary, it is important that a corresponding private key also be accessible to the authentication server 204. Command 512 is indicative of what command (i.e. compare or enroll) a client 200 should facilitate. Timestamp 514 is a time value indicative of a time associated with the session initiation. Other data 516 may also be provided with session data 506. After session packet 500 is assembled and encrypted in accordance with encryption component 252, it is transmitted to client 200.

Figure 8:
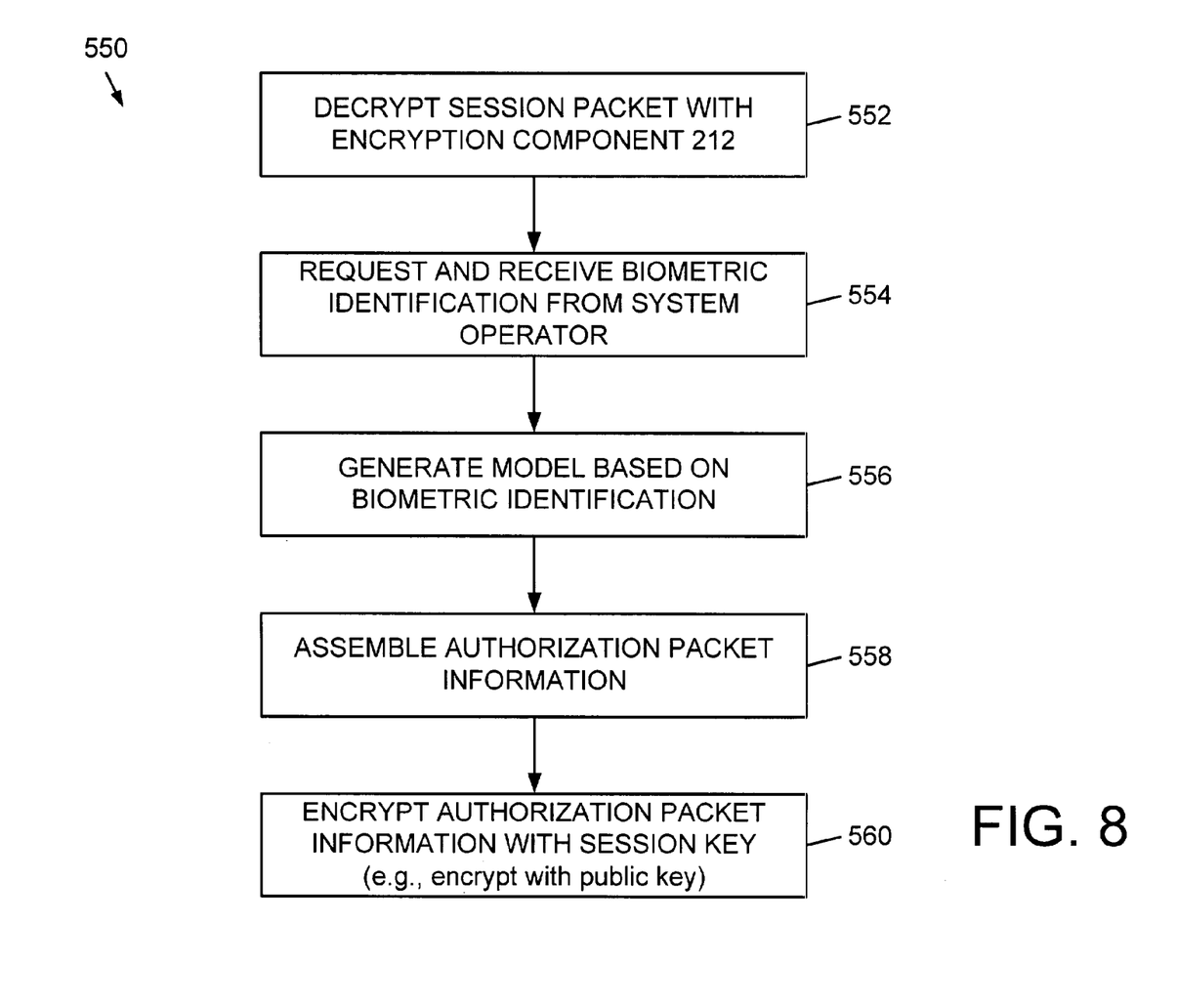
FIG. 8 is a flow diagram illustrating creation of an authorization packet.

Once client 200 receives session packet 500, client 200 performs method 550 illustrated in FIG. 8. The method includes decrypting the session packet at step 552. This decrypting is completed using an encryption component, in particular, encryption component 212 illustrated in FIG. 5. Once the session packet is decrypted, client 200 will request and receive biometric identification from a user based on the command received in a session packet. In one mode of operation, the user will perform a fingerprint scan utilizing reader 12. At step 556, an authentication model is generated. At step 558, authorization packet information is assembled. The authorization packet information includes the session number sent in the session packet and the authentication model generated in step 556. Once the authorization packet information is assembled, the information is encrypted with the session key (public key) sent in session packet 500. This is completed in step 560.

Figure 9:
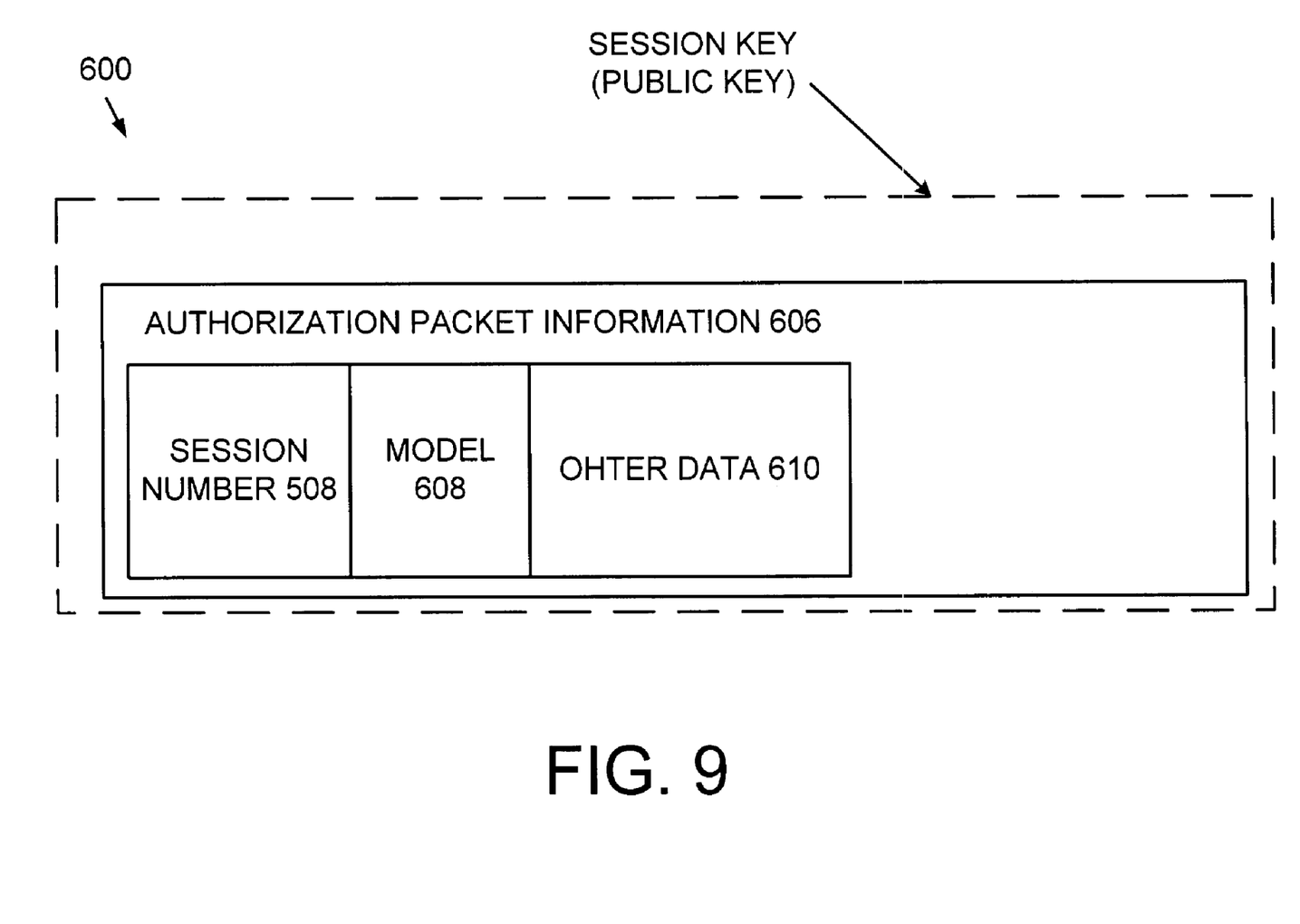
FIG. 9 is a diagrammatic view of an authorization packet.

FIG. 9 illustrates authorization packet 600. Authorization packet 600 is encrypted with session key (the public key) and includes authorization packet information 606. Authorization packet information 606 includes session number 508, authentication model 608 and other data 610. Once authorization packet 600 is assembled, it is transmitted to authentication server 204 via application server 202.

Figure 10:
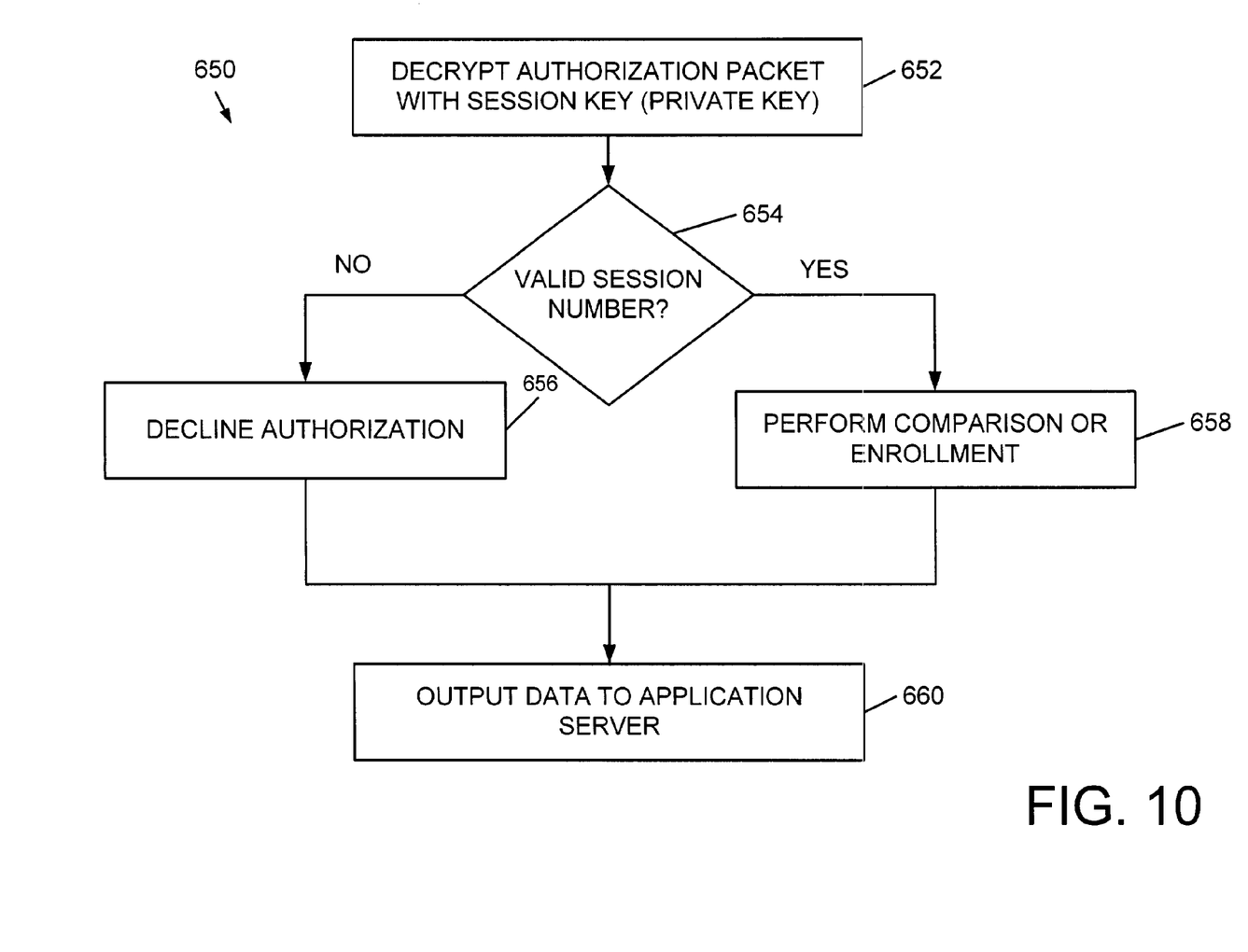
FIG. 10 is a flow diagram illustrating evaluation of an authorization packet.

Once authentication server 204 has received authorization packet 600, method 650, illustrated in FIG. 10, is performed. Initially, the authorization packet 600 is decrypted utilizing the retained session key (the private key) at step 652. Next, at step 654, the session number is validated. In order to provide enhanced security, the authorization may be declined if the session number is not valid, for example, if it does not match the retained value, or, if the authorization packet was not received within a specified amount of time. Authorization is declined at step 656 and output data is sent to the application server indicative of a decline in authorization at step 660. If a valid session number is received, the method performs a comparison or enrollment at step 658. Once the comparison or enrollment is performed, output data is sent to the application server at step 660. As described earlier, the output data sent at step 660 may be a variety of different types of information. In one mode, the output is a decline or acceptance of authorization. In another mode, data associated with a user may be sent, for example a credit card authorization based on a user's records.

Although the present invention has been described with reference to preferred embodiments, workers skilled in the art will recognize that changes may be made in form and detail without departing from the spirit and scope of the invention.

What is claimed is:

1. A method for utilizing an authentication module to facilitate a regulation of user access in the context of a biometric security system, the method comprising:
   pre-establishing an encryption relationship between a client security system and the authentication module;
   receiving an instruction to begin an authorization session;
   generating a session packet, encrypting it, and transmitting it to the client security system, wherein generating a session packet comprises obtaining a session key and storing it in the session packet, the session key being configured to be utilized to encrypt data;
   obtaining a decryption component associated with the session key before transmitting the session packet to the client security system; and
   receiving an authorization packet, decrypting it using the decryption component, and providing information to grant or deny access based on a content of a collection of authentication information contained in the authorization packet.

2. The method of claim 1, wherein generating a session packet further comprises generating a session number and storing it in the session packet.

3. The method of claim 2, further comprising storing the session number in a database associated with the authentication module.

4. The method of claim 1, further comprising storing the decryption component associated with the session key in a database associated with the authentication module.

5. The method of claim 1, wherein receiving an authorization packet and decrypting it comprises receiving an authorization packet and decrypting with an encryption key that is complimentarily related to the session key.

6. The method of claim 1, wherein obtaining a session key comprises generating a public key portion of a PKI key pair.

7. The method of claim 6, wherein receiving an authorization packet and decrypting it comprises receiving an authorization packet and decrypting with a private key portion of the PKI key pair.

8. The method of claim 1, wherein receiving an authorization packet and decrypting it comprises receiving an authorization packet and decrypting it with an encryption component that is independent of the pre-established encryption relationship.

9. The method of claim 1, wherein generating a session packet comprises generating a session time stamp and storing it in the session packet.

10. The method of claim 1, wherein generating a session packet further comprises:
   generating a session number and storing it in the session packet; and
   generating a session time stamp and storing it in the session packet.

11. The method of claim 10, further comprising storing the session number and the session time stamp in a database associated with the authentication module.

12. The method of claim 1, wherein providing information to grant or deny access based on the content comprises comparing a session number to a list of valid values, and providing information to grant or deny access based at least in part on the comparison.

13. The method of claim 1, wherein providing information to grant or deny access based on the content comprises evaluating a session time stamp to determine whether the authorization packet was received within a predetermined time period, and providing information to grant or deny access based at least in part on the evaluation.

14. The method of claim 1, wherein providing information to grant or deny access based on the content comprises comparing a data representation of a user's biometric information to at least one data representation of biometric information stored in a database, and providing information to grant or deny access based at least in part on the comparison.

15. The method of claim 1, wherein providing information to grant or deny access based on the content comprises:
   comparing a session number to a list of valid values;
   evaluating a session time stamp to determine whether the authorization packet was received within a predetermined time period;
   comparing a data representation of a user's biometric information to at least one data representation of biometric information stored in a database; and
   providing information to grant or deny access based on results of the comparing of the session number, the evaluating of the session time stamp and the comparing of the data representation.

16. The method of claim 1, wherein pre-establishing an encryption relationship comprises storing a first encryption component with the client computing device and a second encryption component with the authentication module, one of the first and second encryption components being configured to decrypt information that has previously been encrypted utilizing the other of the first and second encryption components.

17. The method of claim 16, wherein encrypting the session packet comprises encrypting the session packet utilizing one of the first and second encryption components.

18. The method of claim 1, wherein pre-establishing an encryption relationship comprises storing a first part of a PKI key pair with the client computing device and a second part of the PKI key pair with the authentication module, one of the first and second parts being configured to decrypt information that has previously been encrypted utilizing the other part.

19. The method of claim 18, wherein encrypting the session packet comprises encrypting the session packet utilizing one of the first and second parts of the PKI key pair.

20. The method of claim 1, wherein pre-establishing an encryption relationship comprises storing a first part of a static encryption key pair with the client computing device and a second part of the static encryption key pair with the authentication module, one of the first and second parts being configured to decrypt information that has previously been encrypted utilizing the other part.

21. The method of claim 20, wherein encrypting the session packet comprises encrypting the session packet utilizing one of the first and second parts of the static encryption key pair.

22. The method of claim 1, wherein utilizing an authentication module comprises utilizing an authentication module to regulate user access to a collection of information associated with an application module.

23. The method of claim 22, wherein utilizing an authentication module to regulate user access to a collection of information associated with an application module comprises:
   utilizing an authentication module to regulate user access to a collection of information associated with an application module that is remotely accessed by a client computing device upon which the client security system is implemented.

24. The method of claim 23, wherein utilizing an authentication module to regulate user access to a collection of information associated with an application module that is remotely accessed by a client computing device upon which the client security system is implemented comprises: utilizing an authentication module to regulate user access to a collection of information associated with an application module that is accessed through the Internet by a client computing device upon which the client security system is implemented.

25. The method of claim 22, wherein utilizing an authentication module to regulate user access to a collection of information associated with an application module comprises utilizing the authentication module to remotely interact with the application module.

26. The method of claim 25, wherein utilizing the authentication module to remotely interact with the application module comprises utilizing the authentication module to remotely interacting with the application module through the Internet.

27. A data packet for transmission from an authentication module to a client security system during a process of authentication within a biometric security system, the data packet comprising:
   a session key, the session key being a public key portion of a PKI key pair configured to be utilized to encrypt data.

28. The data packet of claim 27, further comprising a session number.

29. The data packet of claim 28, wherein the session number is a value that corresponds to a session initiated when the data packet is generated.

30. The data packet of claim 28, further comprising a time stamp that represents a time value when the session was initiated.

31. The data packet of claim 27, further comprising a time stamp.

32. The data packet of claim 31, wherein the time stamp is a time value that corresponds to the approximate beginning of a session initiated when the data packet is generated.

33. The data packet of claim 27, further comprising a session number and a time stamp.

34. The data packet of claim 33, further comprising a collection of command data.

35. A biometric security system, comprising:
   a client security system configured to make a request for access;

an application module being configured to receive the request and respond by sending an instruction to initiate an authentication session; and an authentication module configured to receive the instruction and respond by generating a session packet that is transferred to the client security system, the client security system being further configured to generate an authorization packet that is returned to the authentication module after being encrypted utilizing an encryption key contained in the session packet.

36. The system of claim 35, wherein the authentication module is configured to encrypt the session packet with a first part of a complementary encryption key pair, and wherein the user security system is configured to decrypt the session packet with a second part of the complementary encryption key pair.

37. The system of claim 36, wherein the first part of the complementary key pair is a first part of a PKI key pair that is stored with the authentication module, and wherein the second part of the complementary key pair is a second part of a PKT key pair that is stored with the client security system.

38. The system of claim 36, wherein the first part of the complementary key pair is a first part of a static key pair that is stored with the authentication module, and wherein the second part of the complementary key pair is a second part of a static key pair that is stored with the client security system.

39. The system of claim 35, wherein the client security system is further configured to obtain a session key and store it in the session packet, and wherein the client security system is configured to encrypt the authorization packet utilizing the session key.

40. The system of claim 39, wherein the authentication module is further configured to decrypt the authorization packet with a retained session key that is complementary to the session key, the retained session key being stored in a location that is accessible to the authentication module.

41. The system of claim 40, wherein the client security system is further configured to obtain user biometric information and store it in the authorization packet.

42. A method for utilizing an authentication module to facilitate a regulation of user access in the context of a biometric security system, the method comprising:

pre-establishing an encryption relationship between a client security system and the authentication module;
receiving an instruction to begin an authorization session;
generating a session packet, encrypting it, and transmitting it to the client security system, wherein generating a session packet comprises generating a session number and storing it in the session packet;
storing the session number in a database associated with the authentication module; and
receiving an authorization packet, decrypting it, and providing information to grant or deny access based on the content of a collection of authentication information contained in the authorization packet.

43. A method for utilizing an authentication module to facilitate a regulation of user access in the context of a biometric security system, the method comprising:

pre-establishing an encryption relationship between a client security system and the authentication module;
receiving an instruction to begin an authorization session;
generating a session packet, encrypting it, and transmitting it to the client security system, wherein generating a session packet comprises generating a session number and storing it in the session packet; and
receiving an authorization packet, decrypting it, comparing the session number to a list of valid values, and providing information to grant or deny access based at least in part on the comparison.

44. A method for utilizing an authentication module to facilitate a regulation of user access in the context of a biometric security system, the method comprising:

pre-establishing an encryption relationship between a client security system and the authentication module;
receiving an instruction to begin an authorization session;
generating a session packet, encrypting it, and transmitting it to the client security system, wherein generating a session packet comprises generating a session number and storing it in the session packet; and
receiving an authorization packet, decrypting it, and comparing a data representation of a user's biometric information to at least one data representation of biometric information stored in a database, and providing information to grant or deny access based at least in part on the comparison of the data representation.

45. The method of claim 44, wherein the step of receiving an authorization packet further comprises: comparing the session number to a list of valid values;
evaluating a session time stamp to determine whether the authorization packet was received within a predetermined time period; and
wherein providing information to grant or deny access is further based on results of the comparing of the session, number and the evaluating of the session time stamp.

* * * * *